United States Patent [19]

Imeson, deceased

[11] 3,710,818
[45] Jan. 16, 1973

[54] IRRIGATION SYSTEM

[76] Inventor: James G. Imeson, deceased, late of P. O. Box 632, Jackson, Wyo. 083001 Joyce Imeson Lucas, executrix

[22] Filed: June 26, 1969

[21] Appl. No.: 836,863

Related U.S. Application Data

[63] Continuation-in-part of Ser. No. 749,020, July 31, 1968, Pat. No. 3,575,200.

[52] U.S. Cl. ............................................... 137/344
[51] Int. Cl. .............................. B05b 9/02, E01h 3/02
[58] Field of Search ..239/212, 213; 137/344; 200/16

[56] References Cited

UNITED STATES PATENTS

| | | | |
|---|---|---|---|
| 3,009,645 | 11/1961 | Nugent | 239/213 X |
| 3,222,466 | 12/1965 | Helus et al. | 200/16 |
| 3,246,101 | 4/1966 | Caputo | 200/16 X |
| 3,287,513 | 11/1966 | McFarland | 200/16 |
| 3,353,751 | 11/1967 | Dowd | 239/212 X |
| 3,378,796 | 4/1968 | Caputo | 200/16 X |
| 3,394,729 | 7/1968 | Bower et al. | 239/212 X |
| 3,444,914 | 5/1969 | Purtell | 239/212 X |
| 3,447,751 | 6/1969 | Wieck | 239/212 |
| 3,463,175 | 8/1969 | Rogers | 137/344 X |

*Primary Examiner*—Samuel Scott
*Attorney*—Lawrence J. Winter

[57] ABSTRACT

An irrigation vehicle comprising a self-propelled vehicle adapted to move along a water supply line or a source of water supply means on the ground. Water delivery means are provided on the vehicle for detachable connection to the pipeline or the source of water at predetermined stations along the path of travel of the vehicle. The vehicle is provided with turning means so that it may be moved laterally across a field that is being irrigated.

16 Claims, 17 Drawing Figures

PATENTED JAN 16 1973

FORWARD

INVENTOR.
James G. Imeson
BY
Lawrence J. Winter
Attorney

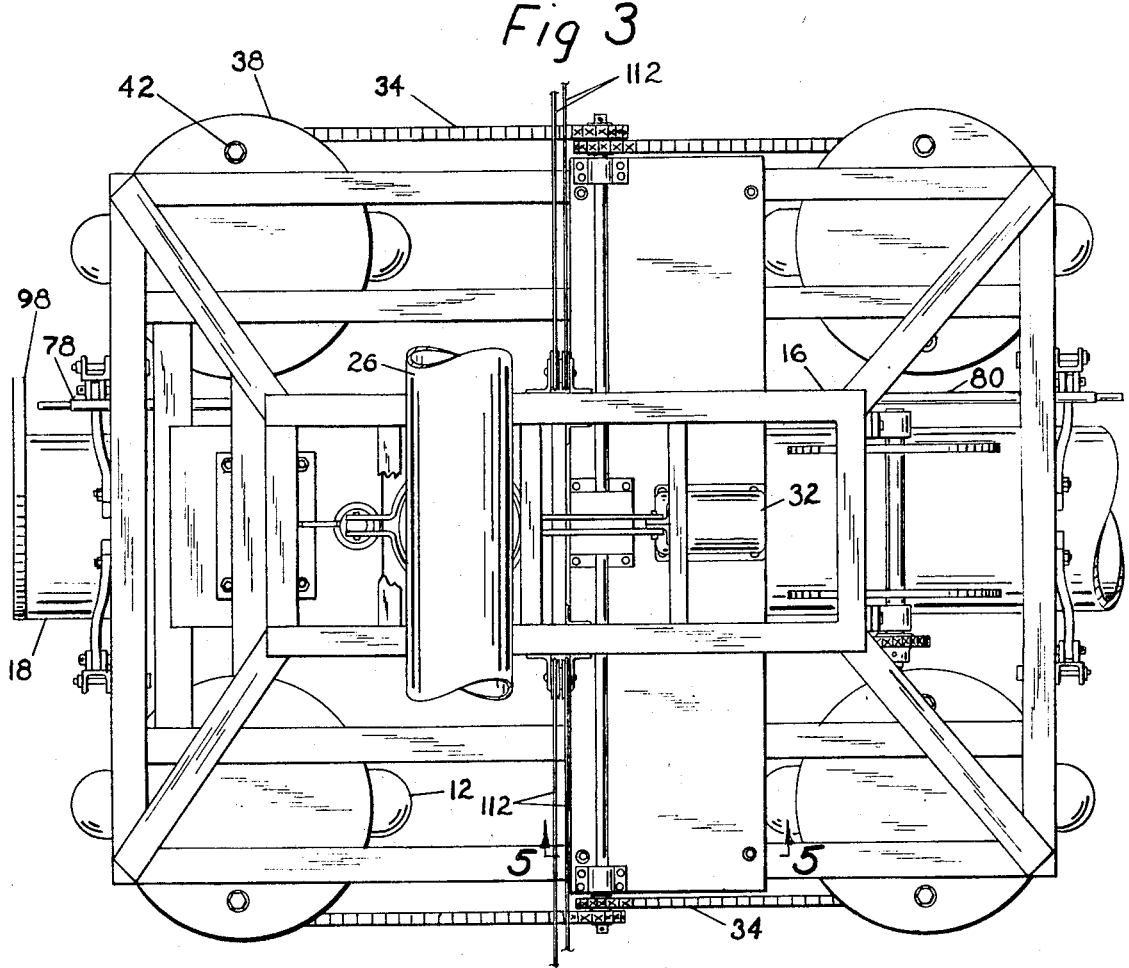
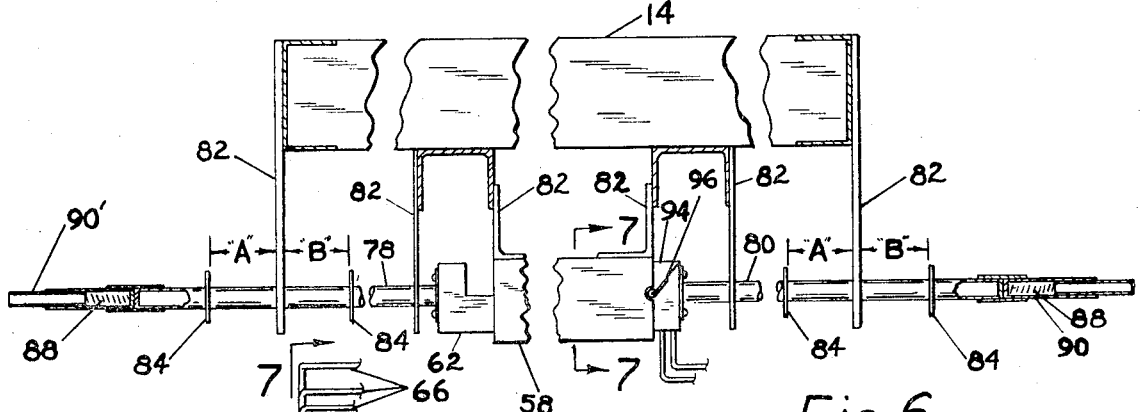
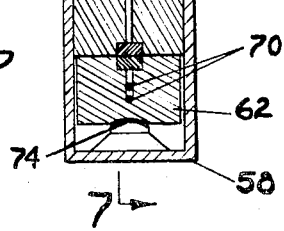

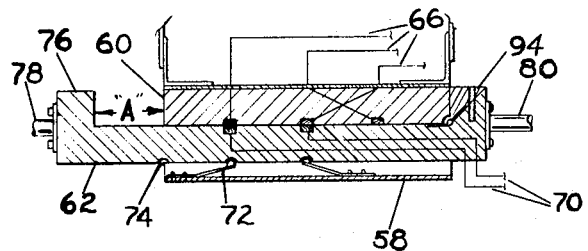
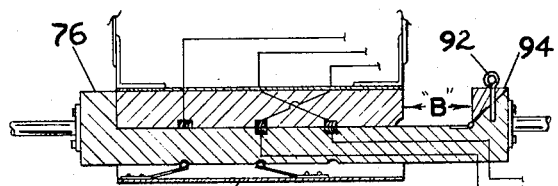
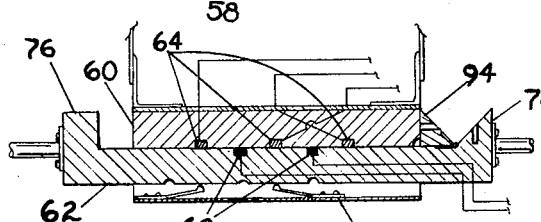
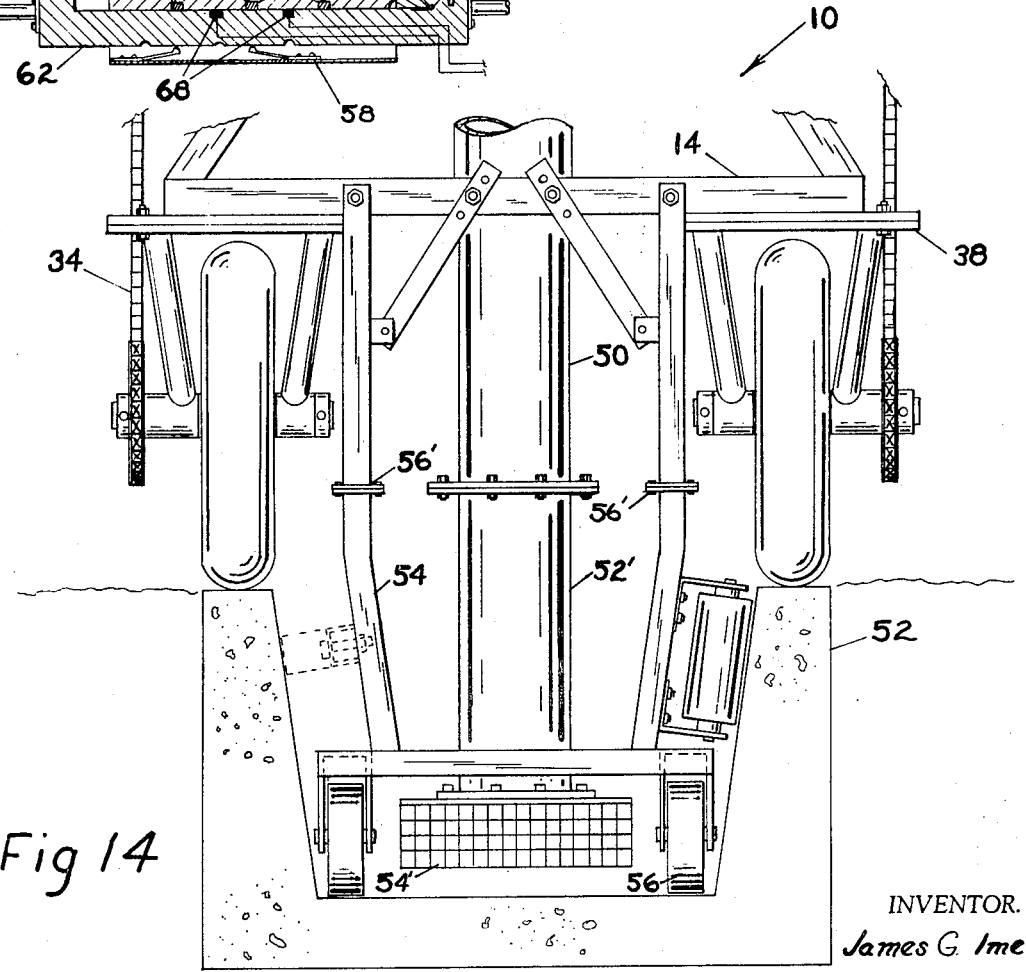

PATENTED JAN 16 1973

INVENTOR.
James G. Imeson
BY
Lawrence J. Winter
Attorney

IRRIGATION SYSTEM

The present invention is a continuation-in-part of my Patent application Ser. No. 749,020, filed July 31, 1968, now U.S. Pat. No. 3,575,200.

The present invention relates to an irrigation system and more particularly to an irrigation system in which a transport vehicle is provided for passing along a field and stopping at predetermined stations in the field for attachment of a water delivery pipe on the vehicle to an individual discharge outlet disposed in a fixed water supply line disposed in the field to be irrigated, so that a certain localized area of the field may be irrigated and then the vehicle can pass along to the next station for irrigation of the next adjacent portion of the field, so that the field is progressively or sequentially irrigated and the vehicle may return along the same pipeline for further irrigation, as desired.

Such an irrigation system is provided with a vehicle having bowl means thereon for connection to a valve means in a fixed pipeline so that the water may pass from the pipeline to the vehicle and the vehicle is provided with a relatively long pipe carried by the main vehicle and a plurality of auxiliary vehicles approximately 90 feet apart so that a large area of the land or field may be irrigated from the one source of supply or connection to the fixed pipe.

In the present invention, instead of merely taking the source of supply from a fixed pipeline, the vehicle may also be disposed so as to travel along a ditch or trough in the ground and the water may be taken from the open trough or ditch through a suction line and also discharged through the elongated pipeline carried by the main vehicle and the auxiliary vehicles.

It is an object of the present invention to provide a vehicle having means for permitting the vehicle wheels to be turned or rotated so that the system can be transported laterally across a field instead of just along the axis of the fixed pipeline or the supply trough or ditch.

It is another object of the present invention to provide an irrigation system for carrying an elongated pipe on a plurality of self-propelled vehicles which are provided with reverse slip switch means thereon so that the system will stop at the initial starting place and can be stopped at the terminal end of the field or will automatically travel back and forth to irrigate the field as it reaches the opposite ends of the field.

Still another object of the present invention is to provide control means operatively connected to switch means and including wire means so that when one of the auxiliary vehicles disposed laterally of the other vehicles gets out of alignment with the other vehicles it can be started or stopped until it is again in alignment with the adjacent vehicles.

Another object of the present invention is to provide an irrigation system that has a self-propelled vehicle which can pump the water out of a trough or a ditch and further has means for detaching the pipe and guidance devices that extend below the ground level and into the ditch so that the vehicle can be provided with means for enabling it to travel sideways or transversely of the axis of the ditch.

Another object of the present invention is to provide a vehicle having a platform rigidly attached to the under surface of the supply pipe and with the wheel means thereon being disposed longitudinally of each other and having a sufficient width so that the four vehicle wheels of the main carriage vehicle are properly disposed and located with respect to the riser from the fixed supply line so that the vehicle will be properly positioned when the automatic valve action takes place.

Various other objects and advantages of the present invention will be readily apparent from the following detailed description when considered in connection with the accompanying drawings forming a part thereof, and in which FIG. 1 is a side elevational view of the main vehicle carriage embodied in the present invention shown disposed over a fixed delivery pipe with a capping bowl adapted to be connected to the riser in the fixed pipeline.

FIG. 3 is a top plan view of the main irrigation vehicle illustrated in FIG. 1.

FIG. 6 is a view taken along the lines 6—6 of FIG. 2 illustrating the control reversing means for starting and stopping the self-propelled vehicle when it has traveled to one of the ends of the field to be irrigated.

FIG. 7 is an enlarged view of the slip switch illustrated in FIG. 6 taken along the line 7—7 of FIG. 6.

FIG. 8 is a view of the slip switch taken along the lines 8—8 of FIG. 7 illustrating the slidable slip switch when it is disposed in a position to cause forward movement of the vehicle, as shown in FIG. 6.

FIG. 8a is a view similar to FIG. 8 but illustrating the slip switch when it is disposed in a position to cause the vehicle to travel in a reverse direction.

FIG. 8b is a view similar to FIG. 8 but illustrating the slip switch in a neutral position with the fall block in the down position.

Figure 9:
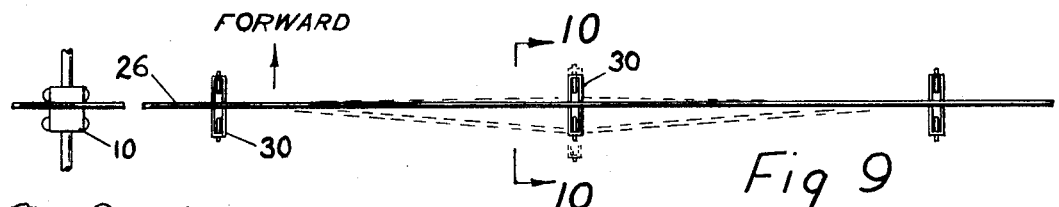

FIG. 9 is a more or less diagrammatic plan view of the irrigation system with the broken lines in one position illustrating the delivery pipe carried by the self-propelled vehicles flexed out of line with one auxiliary vehicle travelling at a faster rate of speed than the adjacent vehicles and with other broken lines illustrating the pipe flexed and out of position with the adjacent vehicles when an auxiliary vehicle is lagging behind the other vehicles.

Figure 10:
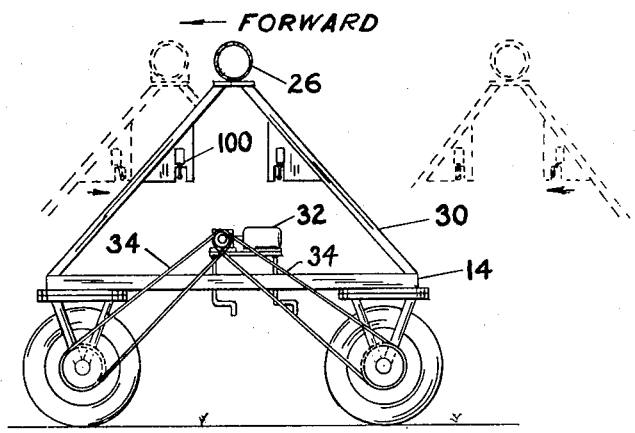

FIG. 10 is an enlarged view taken along the lines 10—10 of FIG. 9 illustrating the auxiliary vehicle therein travelling in a normal position, and with broken lines indicating the vehicle disposed in a position ahead of the adjacent vehicles and with other broken lines illustrating the vehicle in a lagging position with respect to the adjacent vehicles.

Figure 11:
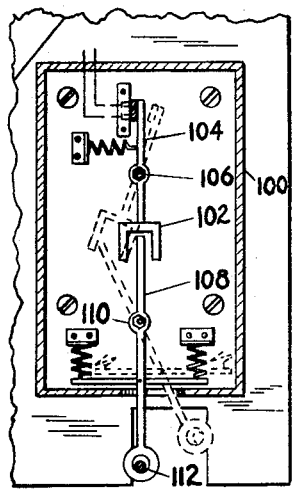

FIG. 11 is an enlarged view of the alignment control switch illustrated in FIG. 10, with the position in solid lines illustrating the normal travel position shown in FIG. 10 and with the dotted line position illustrating the switch position when the vehicle shown in FIG. 10 travelling faster than its normal rate of speed.

Figure 1:
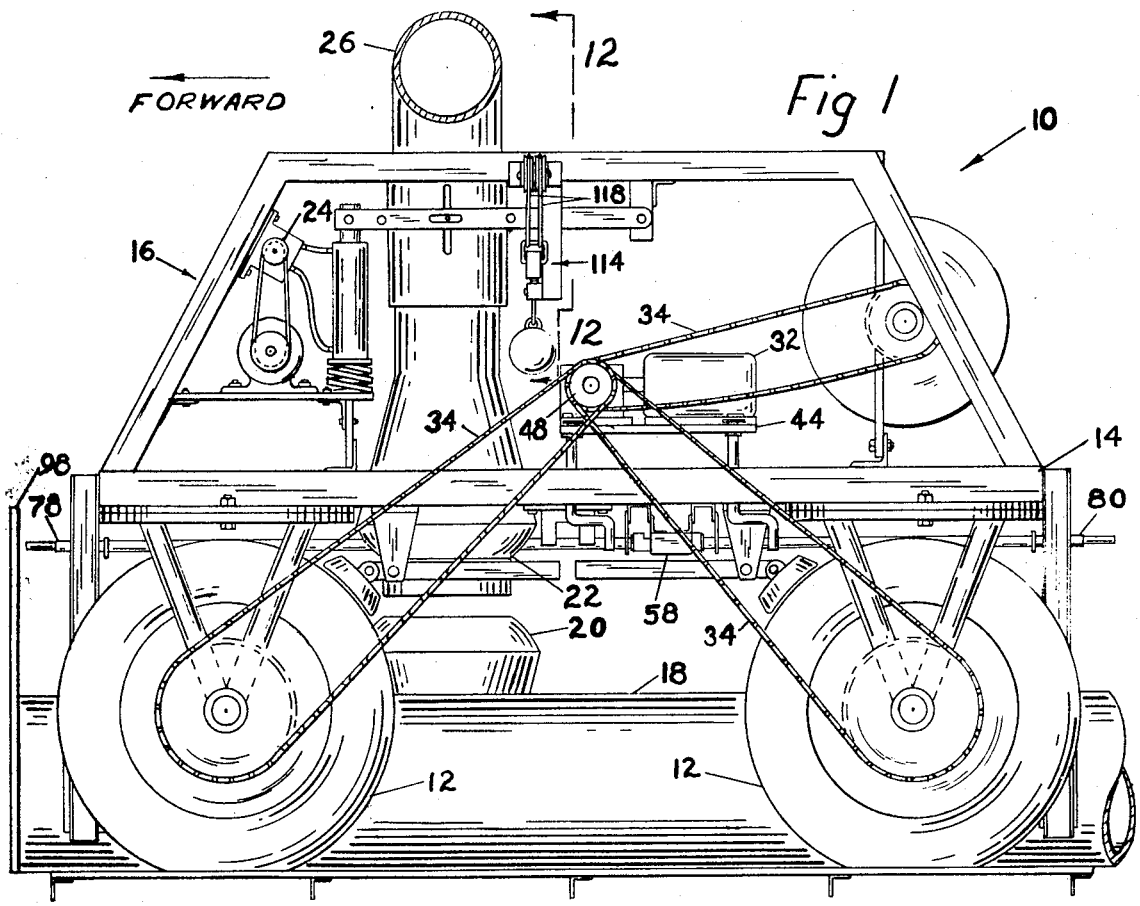
Figure 12:
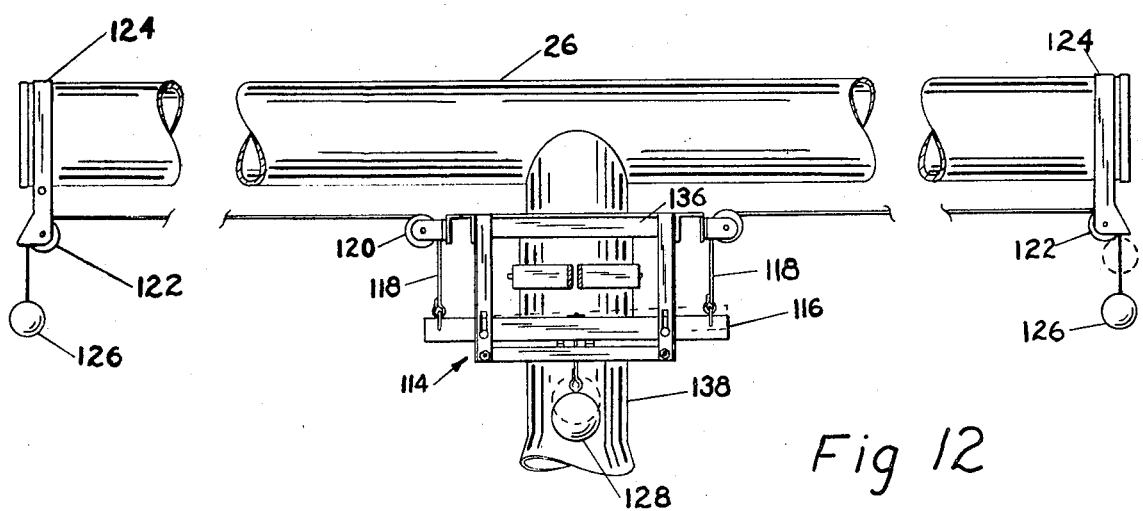

FIG. 12 illustrates the safety device that stops the complete system when one of the vehicles becomes stuck and is a view taken along the lines 12—12 of FIG. 1.

Figure 13:
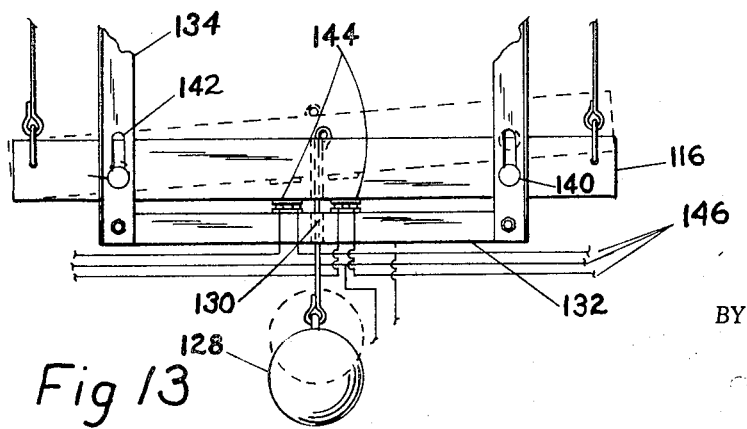

FIG. 13 is an enlarged detail view of the teeter bar and contact bar shown in FIG. 12 breaking contact for stopping the complete system.

FIG. 14 is a view of a modification of the main vehicle illustrated in FIG. 1.

Referring to the drawings, the irrigation main vehicle is generally designated as 10 and is provided with a plurality of wheels 12 on the bottom thereof secured to a horizontal platform 14 which has a frame 16 thereover. The structure of the self-propelled vehicle is substantially as described in my earlier application, Ser. No. 749,020 as hereinabove mentioned. The vehicle is adapted to straddle and move along a fixed supply pipe 18 having a source of supply water from a location not shown. The pipe 18 is provided with a riser 20 at spaced intervals therealong, and the vehicle is provided with a capping bowl 22 adapted to be connected to the riser to receive water therefrom as described in my earlier application. The capping bowl 22 is provided with lifting and lower means generally designated 24, and the frame carries a delivery pipe 26 which is supported by a plurality of laterally spaced auxiliary vehicles 30, as best seen in FIG. 9. These vehicles are spaced approximately 90 feet apart and are provided with individual electric motors so that they are self-propelled.

Figure 4:
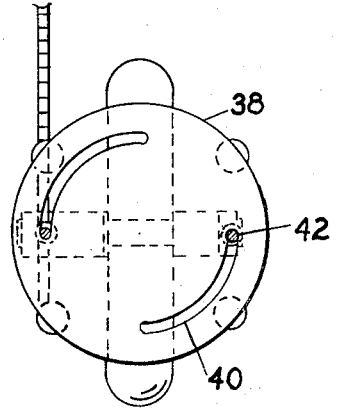
FIG. 4 is a view taken along the lines 4—4 of FIG. 2 illustrating the lower circular plate that is rotated to turn the wheels of the vehicle for sideway travel.

The main vehicle is provided with an electric motor drive means 32 which drives the wheels through a plurality of sprocket chains 34. The wheels 12 are disposed on axles supported by struts 36 secured to a flat circular plate 38' having spaced a grooves 40 therein, as best seen in FIG. 4. The circular plates 38 are connected to the platform 14 through threaded bolt and nut members 42 extending through the arcuate slots 40.

Figure 5:
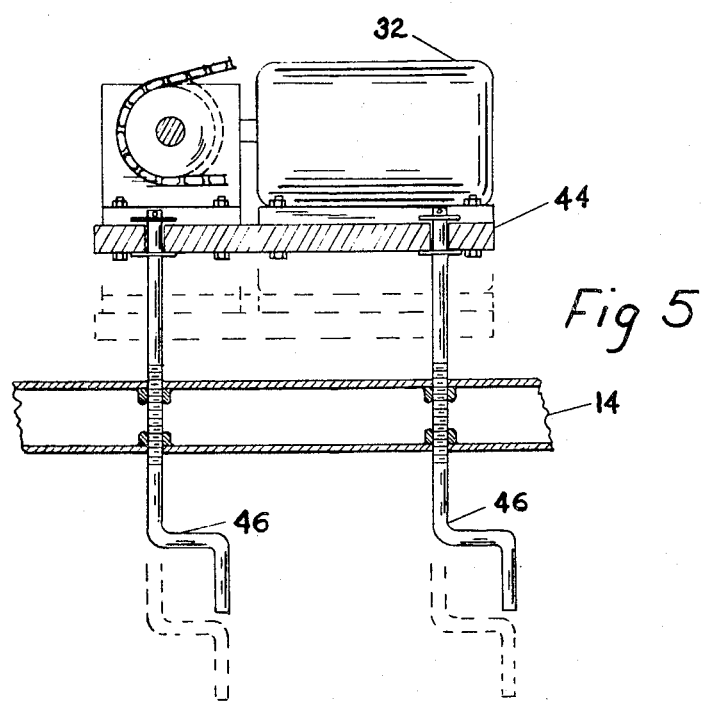
FIG. 5 is an enlarged elevational view taken along the lines 5—5 of FIG. 3 illustrating the means for lowering and raising the drive motor platform to remove the sprocket chains in order to turn the vehicle wheels.
Figure 2:
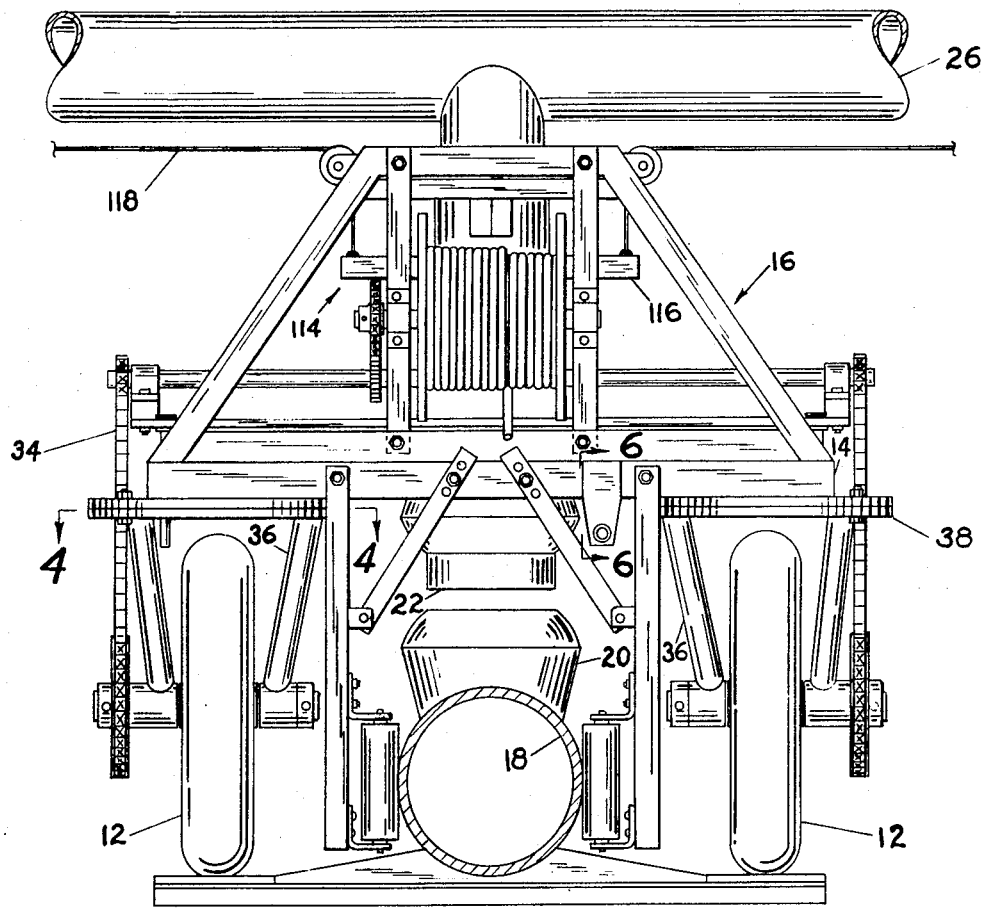
FIG. 2 is a rear view of the irrigation vehicle illustrated in FIG. 1.
Figure 4A:
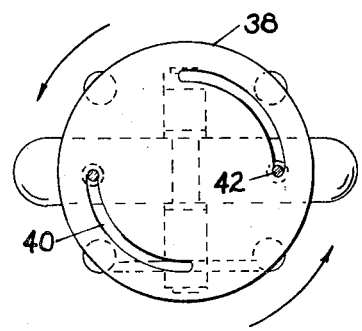
FIG. 4a is a view similar to FIG. 4, but illustrating the lower circular plate after it has been turned approximately 90°.

In order to rotate or turn the wheels 12 from the position illustrated in FIGS. 1 and 2 to a position disposed 90° therefrom, or to the position shown in FIG. 4a, it is first necessary to lower the motor platform 44 carrying the drive motor, as best illustrated in FIGS. 1 and 5. The motor platform 44 is lowered by turning the crank members 46 illustrated in FIG. 5 to the position illustrated in dotted lines therein. After the sprocket chains have been removed from the drive sprocket 48, the bolts 42 illustrated in FIG. 4 can be loosened and the wheels rotated in the direction of the arrow illustrated in FIG. 4a. Then the vehicle is adapted to be transported laterally across a field as distinguished from moving along the axis of the supply pipe8a003618.

The auxiliary vehicles 30 are also provided with circular grooved plates, and they also can have their wheels manually turned 90° by loosening the bolts and revolving or rotating the lower circular plates 90°, or until the bolts are in the opposite ends of their respective grooves.

Referring to the modification of the invention illustrated in FIG. 14, the self-propelled main vehicle 10 therein is substantially the same as that described in FIGS. 1 and 2 except that it is provided with an elongated vertical pipe 50 connected to the platform 14 so that it can receive water from a supply ditch or trough 52. The lower end of the pipe 50 is provided with a detachable flange section $52^1$ and a filter screen $54^1$ which goes down into the sump of the ditch. The pipe section 50 is supported by guide supports 54 having roller wheels 56 on the lower end thereof. These guide supports are also provided with detachable bolt flanges $56^1$ so that the lower section $52^1$ and the guide supports 54 can be disconnected when the wheels 12 are turned 90° for passing across a field rather than in a direction parallel to the ditch. A plate, not shown, may be utilized for placing across the ditch so that the wheels may be moved across the open ditch.

Referring to FIGS. 6 to 8, the reversing mechanism for the self-propelled irrigation vehicle is best illustrated therein and comprises a slip switch box generally designated 58 adapted to reverse the direction of travel of the vehicle after it has reached a predetermined position in the field. Thus, the reverse mechanism can be utilized to have the vehicle travel from its initial position across a field to be irrigated and then stop and thereafter move rearwardly back to its initial starting place and so on.

The switch comprises an upper insulated block 60 and a lower slidable insulated block 62, as best seen in FIGS. 6 and 7. Referring to FIG. 8, it will be noted that the upper block 60 is provided with three spaced contact points 64 appropriately connected to their electric wires or conduits which are connected at their other ends to the drive motors of the entire system. The lower block member 62 is provided with two spaced contact points 68 appropriately connected to electric wires or conduits which have their other ends connected to the electrical source of power. These electric wires to which the contact points 68 are connected are designated 70, as best seen in FIG. 8. Referring to FIG. 8, it will be noted that the lower block 62 is maintained in contact with the surface and the contact points of the upper block 60 by leaf spring members 72 which bear against the under surface of the block 62. The block 62 is further provided with spaced notches 74 so that when the slidable block 62 is moved to its predetermined position for making contact for forward movement or reverse movement of the vehicle, the leaf springs have their outer ends disposed in the notches 74. The position of the slip switch in FIG. 8 illustrates forward travel of the vehicle in the direction indicated by the arrow in FIG. 8, while the position of the slip switch illustrated in FIG. 8a is illustrative of the position of the switch when the vehicle is moving in a reverse direction. The switch shown in FIG. 8b is illustrative of the switch when it is in a neutral position and when the vehicles are stopped.

Referring to FIG. 6, it will be noted that the slidable block 62 of the slip switch has connected to the two upwardly projecting end portions 76, horizontal rods including a front slip switch rod 78 and a rear rod 80. The slip switch device is supported from a plurality of rod support members 82 connected to the cross frame member and the rods and the switch extend in a direction parallel to the path of travel of the vehicle. The rods are provided with rod stopper members indicated as 84, and it will be seen from FIG. 6 and FIG. 8 and FIG. 8a that the rod stopper members are spaced a distance indicated as A and B on FIGS. 6 and 8 and 8a, in front of and to the rear of the rod support members 82. It will further be noted that the distance or the dimension indicated as A and the dimension indicated as B are identical.

Each of the ends of the rods 78 and 80 are provided with coil springs 88 in a tubular sleeve 90, as best seen in FIG. 6, with a plunger $90^1$ extending out of the end of the sleeve so that the switch is provided with shock absorber means to protect the ends of the slip switch rod because of the inertia of the system.

Referring to FIGS. 8, 8a and 8b, it will be noted that the rear end portion 76 is provided with a pin 92 disposed in a slot therein and a portion 94 of the inner end of the section 76 is wedge shaped. A torsion spring 96, best seen in FIG. 7, normally urges the wedge section 94 to the position shown in FIG. 8b when the pin 92 is removed from the slot. The pin is removed from its slot to allow the torsion spring to rotate the wedge or fall block 94 to the position shown in FIG. 8b when it is desired that the vehicle stop automatically at its initial place of starting, after it has returned from its terminal position cross the field back to its initial starting place. It will be noted that this action of the fall block makes the switch stop in its neutral or open position so that the whole system stops.

To initially start the vehicle in operation so that it moves in a forward direction from an initial starting place, the slip switch device is manually slid or moved into the position shown in FIG. 8. When the vehicle, or the system, reaches the end of the supply pipe and the front end of the slip switch rod contacts the stopper plate 96, shown in FIG. 1, the rod pushes the slip switch to the reverse position, shown in FIG. 8a, causing the system to travel back to the initial starting or beginning of the operation.

When the retainer pin 92 is disposed in the slot, as illustrated in FIG. 8a, when the system or vehicle reaches the initial point of operation or the beginning point of operation, the rod end of the rear slip switch rod will bump or abut against a stopper plate, not shown, at the initial point of operation, and the rear rod will push the slip switch into the position shown in FIG. 8, and the system will reverse again and automatically travel forward to the end of the line again.

Referring to FIGS. 9 to 11, the alignment control device is generally designated as 100 and is illustrated on an auxiliary propelled vehicle 30. In FIG. 10, it will be noted that the auxiliary vehicle is provided with two identical alignment control devices 100, one for use in the forward direction and one for use in the reverse direction of travel. The devices are identical except that they face in the opposite direction. When the auxiliary vehicle is disposed in alignment with the other vehicles, as illustrated in solid lines in FIG. 9, the alignment control device switch, indicated as 102, and as shown in solid lines in FIG. 11, is disposed in a vertical position therein. It will be noted that the alignment control switch 102 comprises an upper fork 104 pivoted about point 106 and a lower rod 108 pivoted about the point 110. The lower rod 108 is provided with a loop or circle on its lower end through which a wire 112 extends.

When one of the auxiliary vehicles, such as is indicated in FIG. 9, gets ahead of the adjacent vehicles and the pipe 26 is flexed forward thereof, the wire 112 moves forward with respect to the other portions of the wire extending between the other auxiliary vehicles and rearwardly with respect to advancing vehicle so as to cause the fork 104 to be pivoted to cause the fork 104 to open and thus to break the circuit and cut off the motor.

When the vehicle illustrated in FIG. 10 advances ahead of the other vehicles, as indicated by the dotted lines in FIG. 10 to the left thereof, the switches on each vehicle are automatically operated by the tight wire to disconnect the electrical current and thereby temporarily stop each individual vehicle when it advances beyond a certain limit ahead the adjacent or lagging vehicle.

When travelling forward, the lever of a rearward switch of a lagging vehicle moves in the direction of the arrow indicated in the right dotted position of FIG. 10 but has no effect because the electric current is then off from the circuit serving all rearward switches. When the vehicle is travelling forward, all forward alignment switches are automatically in control while when travelling rearwardly, all rearward alignment switches are automatically in control.

Referring to FIGS. 12 and 13, it will be seen that the delivery pipe 26 of the main vehicle is provided with a safety control device generally designated as 114 which comprises a teeter bar 116 having its opposite ends connected to cables or wires 118 which are suspended over pulleys 120 and have their opposite ends suspended over other pulleys 122 supported by ring members 124 attached to the outer ends of the delivery pipe 26. The outer ends of the wires 118 are provided with weights 126 thereon. A center weight 128 is connected to the center of the teeter bar 116 and passes through a slot 130 in a horizontal bar 132. The horizontal bar is connected to two vertical members 134 which have their upper ends connected to a support frame member 136 which extends around the vertical uplift pipe 138. The teeter bar 116 is provided with large headed lugs 140 which slide up and down in slots 142 in the members 134. Switch contact points 144 are disposed on the upper surface of the horizontal bar 132 and the lower surface of the teeter bar 116, as best seen in FIG. 12, and the electrical conduits or wires 146 are connected to the contact points and in the drive motor circuit.

The safety control device 114 works on the principle that a straight line is the shortest distance between two points. When one of the vehicles gets stuck it pulls back on the tight wire like a string of a bow. This causes a need for additional length of wire to reach from the main vehicle to the outer end. Some extra length for tolerance is provided by hanging a weight on each end of each tight wire over a pulley attached to the outer ends of the delivery pipe, as best seen in FIGS. 12 and 13. In this way the safety switch is not opened until the stuck vehicle holds back to the extent that the outer weight affected by the stuck vehicle is raised to its limit. When the outer weight is raised to its limit, the stuck vehicle, continuing to lag still farther behind, causes one end of the teeter bar 116 to rise breaking contact in the safety switch. The whole system is thereby stopped, preventing damage. Tight wires are provided from the safety switch on the main vehicle outward to the left and to the right hand ends, as illustrated in FIG. 12. The center weight 128 is hanging from the middle of the teeter bar 116 and is heavy enough to outweigh the total weight of the outer weights 126 by a slight margin so that the safety switch will remain closed until after the outer weights, either to the left or to the right, are raised to their limit. The height to which the outer weights 126 are permitted to be raised before reaching their limit determines the allowance that a lagging vehicle can get behind before stopping the whole system.

Although it is not visible in the elevation view looking forward, FIG. 12, there are two tight wires extending outward to the left and two tight wires extending outward to the right of the safety switch. This is necessary in order to have alignment control on the return trip as well as when the vehicle is traveling forward.

From the foregoing description it will also be apparent that various changes may be made in the form, location and arrangement of the parts without departing from the spirit and characteristic of the invention, and it is to be understood that this invention is not to be limited except by the scope of the appended claims.

What is claimed is:

1. An irrigation device comprising a self-propelled vehicle adapted to move along a field for irrigation purposes, water delivery means on said vehicle, including a pipe and means for controlling the travel of said vehicle in a forward direction and a reverse direction, comprising a housing with a first stationary block means and a second block means therein, said second block means being slidable relative to said first block means and having upstanding end portions spaced apart from each other a greater distance than the length of said first block means, and said block means having special electrical contact points therein with a first contact position to cause said vehicle to move in a forward direction, and a second contact position to cause the vehicle to move in a reverse direction, and a third neutral position wherein said vehicle is stopped.

2. The device of claim 1 wherein said first block means is disposed above said slidable block and in contact therewith, and biasing means are provided in said housing for maintaining said block means in contact with each other.

3. The device of claim 2 wherein shock absorbing rod means extend outwardly from said block end portions.

4. The device of claim 3 wherein one of said end portions is provided with a wedge section and torsion spring means normally urging said block end portion toward said other block means, and slot and pin means are provided to prevent movement of said section.

5. The device of claim 4 wherein wheel means are provided on said vehicle with flat turntables including arcuate slot means and bolt means extending through said arcuate means adapted to be loosened to turn said wheel means 90°.

6. An irrigation system comprising a plurality of self-propelled vehicles carrying elongated pipe sections through which water is discharged to irrigate a field, electric drive means on each vehicle for supplying propulsion power, and alignment control means on each vehicle, including a forward electric switch and a rearward electric switch for starting and stopping said drive means comprising a stationary contact point and a movable contact point, biasing means normally urging said pivotal contact point into engagement with said stationary point, tight wire means operatively connected to said movable pivotal contact point to move it in one direction to de-energize said drive means, said movable contact point being disposed on one end of a pivoted fork, a pivoted lever disposed below said pivoted fork and having its upper end projecting into said fork.

7. The system of claim 6 wherein said lever has a ring on one end and said tight wire means includes a wire threaded through said ring.

8. The system of claim 6 wherein safety control means are provided, comprising a teeter bar suspended by pulley and wire means with weights disposed on the ends of said wire means, a horizontal bar means disposed adjacent said teeter bar and electrical contact points on both said bars providing a switch means for energizing and de-energizing said electric drive means.

9. The system of claim 6 wherein said vehicles are provided with a slip switch means for energizing said drive means to cause it to go forward, in reverse and to stop said drive means, including a first block and a second block, said blocks having spaced electrical contact points therein with a first contact position to cause said vehicle to move in a forward direction, and a second contact position to cause the vehicle to move in a reverse direction, and a third neutral position wherein said vehicle is stopped.

10. The system of claim 9 wherein said first block is stationary and said second block is a slidable relative to said first block.

11. The system of claim 10 wherein said slidable block is provided with upstanding end portions spaced apart from each other a greater distance than the length of said first block.

12. The system of claim 11 wherein said first block is disposed above said slidable block and in contact therewith, and biasing means are provided in said housing for maintaining said blocks in contact with each other.

13. The system of claim 12 wherein shock absorbing rod means extend outwardly from said block end portions.

14. The system of claim 6 wherein said horizontal bar is supported by vertical members with slots therein and said teeter bar is provided with lugs slidably disposed in a slots.

15. The system of claim 14 wherein a weight is suspended from the center of said teeter bar.

16. The system of claim 15 wherein said pulley means are supported by rings on said pipe.

* * * * *